US010429652B2

(12) United States Patent
Saarikko (10) Patent No.: US 10,429,652 B2
(45) Date of Patent: Oct. 1, 2019

(54) TILED WAVEGUIDE DISPLAY WITH A WIDE FIELD-OF-VIEW

(71) Applicant: Facebook Technologies, LLC, Menlo Park, CA (US)

(72) Inventor: Pasi Saarikko, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 110 days.

(21) Appl. No.: 15/721,074

(22) Filed: Sep. 29, 2017

(65) Prior Publication Data

US 2018/0164591 A1 Jun. 14, 2018

Related U.S. Application Data

(60) Provisional application No. 62/432,828, filed on Dec. 12, 2016.

(51) Int. Cl.
*G02B 5/18* (2006.01)
*G02B 27/01* (2006.01)
(Continued)

(52) U.S. Cl.
CPC ....... *G02B 27/0172* (2013.01); *G02B 6/0016* (2013.01); *G02B 6/0035* (2013.01);
(Continued)

(58) Field of Classification Search
CPC .............. G02B 5/18; G02B 2005/1804; G02B 5/1814; G02B 5/1819; G02B 5/1823;
(Continued)

(56) References Cited

U.S. PATENT DOCUMENTS 8,666,208 B1 3/2014 Amirparviz
2006/0132914 A1 6/2006 Weiss et al.
(Continued)

FOREIGN PATENT DOCUMENTS

WO WO 2013/163347 A1 10/2013
WO WO 2015/078788 A1 6/2015
(Continued)

OTHER PUBLICATIONS

European Extended Search Report, European Application No. 17208645. 6, dated May 3, 2018, 8 pages.
(Continued)

*Primary Examiner* — Arnel C Lavarias
(74) *Attorney, Agent, or Firm* — Fenwick & West LLP (57) ABSTRACT

A waveguide display includes light sources, a source waveguide, an output waveguide, and a controller. Light from each of the light sources is coupled into the source waveguide. The source waveguide includes gratings with a constant period determined based on the conditions for total internal reflection and first order diffraction of the received image light. The emitted image light is coupled into the output waveguide at several entrance locations. The output waveguide outputs expanded image lights at a location offset from the entrance location, and the location/direction of the emitted expanded image light is based in part on the orientation of the light sources. Each of the expanded image light is associated with a field of view of the expanded image light emitted by the output waveguide.

19 Claims, 7 Drawing Sheets

(51) Int. Cl.
*F21V 8/00* (2006.01)
*G02B 27/00* (2006.01)

(52) U.S. Cl.
CPC ........ *G02B 6/0078* (2013.01); *G02B 27/0081* (2013.01); *G02B 2027/0125* (2013.01)

(58) Field of Classification Search
CPC .... G02B 5/1842; G02B 5/1866; G02B 27/01; G02B 27/0101; G02B 27/0103; G02B 2027/0105; G02B 2027/0123; G02B 2027/0125; G02B 2027/0132; G02B 2027/0134; G02B 2027/0138; G02B 27/017; G02B 27/0172; G02B 2027/0174; G02B 2027/0178; G02B 27/42; G02B 27/4227; G02B 27/4205; G02B 27/4272; G02B 27/44
USPC ....... 359/558, 566, 569, 570, 573, 574, 575, 359/576, 13, 618, 630

See application file for complete search history.

(56) References Cited

U.S. PATENT DOCUMENTS

| | | |
|---|---|---|
| 2010/0149073 A1 | 6/2010 | Chaum et al. |
| 2010/0246003 A1 | 9/2010 | Simmonds et al. |
| 2012/0062998 A1 | 3/2012 | Schultz et al. |
| 2013/0314789 A1 | 11/2013 | Saarikko et al. |
| 2016/0252724 A1 | 9/2016 | Nikkhoo |
| 2018/0188540 A1* | 7/2018 | Kimmel ............. G02B 27/0081 |

FOREIGN PATENT DOCUMENTS

| | | |
|---|---|---|
| WO | WO 2016/020643 A1 | 2/2016 |
| WO | WO 2016/142707 A1 | 9/2016 |

OTHER PUBLICATIONS

PCT International Search Report and Written Opinion, PCT Application No. PCT/US2017/061778, dated Feb. 6, 2018, 15 pages.
Saarikko, P. et al., "Diffractive Exit-Pupil Expander with a Large Field of View," Photonics in Multimedia II, Proc. of SPIE, 2008, 6 pages, vol. 7001, A. Tervonen et al. (eds.), [Online] [Retrieved on Jun. 10, 2015] Retrieved from the Internet<URL:http://reviews.spiedigitallibrary.org>.

\* cited by examiner

FIG. 5

TILED WAVEGUIDE DISPLAY WITH A WIDE FIELD-OF-VIEW

CROSS REFERENCE TO RELATED APPLICATIONS

This application claims the benefit of U.S. Provisional Application No. 62/432,828, filed Dec. 12, 2016, which is incorporated by reference in its entirety.

BACKGROUND

The disclosure relates generally to near-eye-display systems, and more specifically to tiled waveguide displays.

Near-eye light field displays project images directly into a user's eye, encompassing both near-eye displays (NEDs) and electronic viewfinders. Conventional near-eye displays (NEDs) generally have a display element that generates image light that passes through one or more lenses before reaching the user's eyes. Additionally, NEDs in virtual reality systems and/or augmented reality systems are typically required to be compact and light weight, and to provide large exit pupil with a wide field-of-vision for ease of use. However, designing a conventional NED with a wide field-of-view can result in rather large lenses, and a relatively bulky and heavy NED.

SUMMARY

A waveguide display is used for presenting media to a user. The waveguide display includes a first light source that emits a first image light corresponding to a first portion of an image, a second light source that emits a second image light corresponding to a second portion of the image that is different than the first portion of the image, a source waveguide including a first entrance area, a second entrance area, a first exit area, and a second exit area, an output waveguide including a third entrance area and a third exit area, and a controller that generates and provides scanning instructions to the source waveguide.

The source waveguide in-couples the first image light at the first entrance area, expands the first image light in at least one dimension, and outputs the expanded first image light via the first exit area. The source waveguide in-couples the second image light at the second entrance area, expands the second image light in a first dimension, and outputs the expanded second image light via the second exit area. The output waveguide in-couples the first image light and the second image light at the third entrance area, expands the expanded first image light and the expanded second image light in at least one dimension that is orthogonal to the first dimension to generate a portion of a magnified image, and outputs the portion of the magnified image via the third exit area towards an eyebox. In some configurations, the expanded first image light propagates along a first direction and the expanded second image light propagates along a second direction opposite to the first direction.

In some embodiments, the source waveguide receives the first image light at a first region and the second image light at a second region, the first region and the second region located at an edge of the source waveguide. The first entrance area may include a first coupling element and the second entrance area may include a second coupling element, each of the first coupling element and the second coupling element including grating elements of a grating period selected based on a refractive index of a material forming the source waveguide.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A tiled waveguide display (also referred to as a "waveguide display") is a display that can widen a field of view of image light emitted from the waveguide display. In some embodiments, the waveguide display is incorporated into, e.g., a near-eye-display (NED) as part of an artificial reality system. The waveguide display includes a tiled waveguide assembly and an output waveguide. The tiled waveguide assembly includes a first light source that emits a first image light corresponding to a first portion of an image, a second light source that emits a second image light corresponding to a second portion of the image that is different than the first portion of the image, a source waveguide including a first entrance area, a second entrance area, a first exit area, and a second exit area, and an output waveguide including a third entrance area and a third exit area. Light from each of the first light source and the second light source is coupled into the source waveguide which emits the image light at specific locations along the source waveguide. Each of the first light source and the second light source may project a one-dimensional line image to an infinite viewing distance through a small exit pupil. The one-dimensional line image can be formed by, for example, using a linear array of sources and a collimating lens. The source waveguide includes a plurality of grating elements with a constant period determined based on the conditions for total internal reflection and first order diffraction of the received image light. To form a two-dimensional image, the source waveguide is scanned line-by-line in a direction orthogonal with respect to the one-dimensional line image projected by the first light source and the second light source. The source waveguide may be tiled around an axis of the projected one-dimensional line image to form the two-dimensional image. The emitted image light is coupled into the output waveguide at a plurality of entrance locations. The output waveguide outputs a plurality of expanded image light at a location offset from the entrance location, and the location/direction of the emitted expanded image light is based in part on the orientation of the first light source and the second light source. Each of the plurality of expanded image light is associated with a field of view of the expanded image light emitted by the output waveguide. In some examples, the total field of view of the tiled waveguide display may be a sum of the field of view of each of the expanded image light.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a HMD connected to a host computer system, a standalone HMD, a mobile device or computing system, or any other hardware platform capable of providing artificial reality content to one or more viewers.

Figure 1:
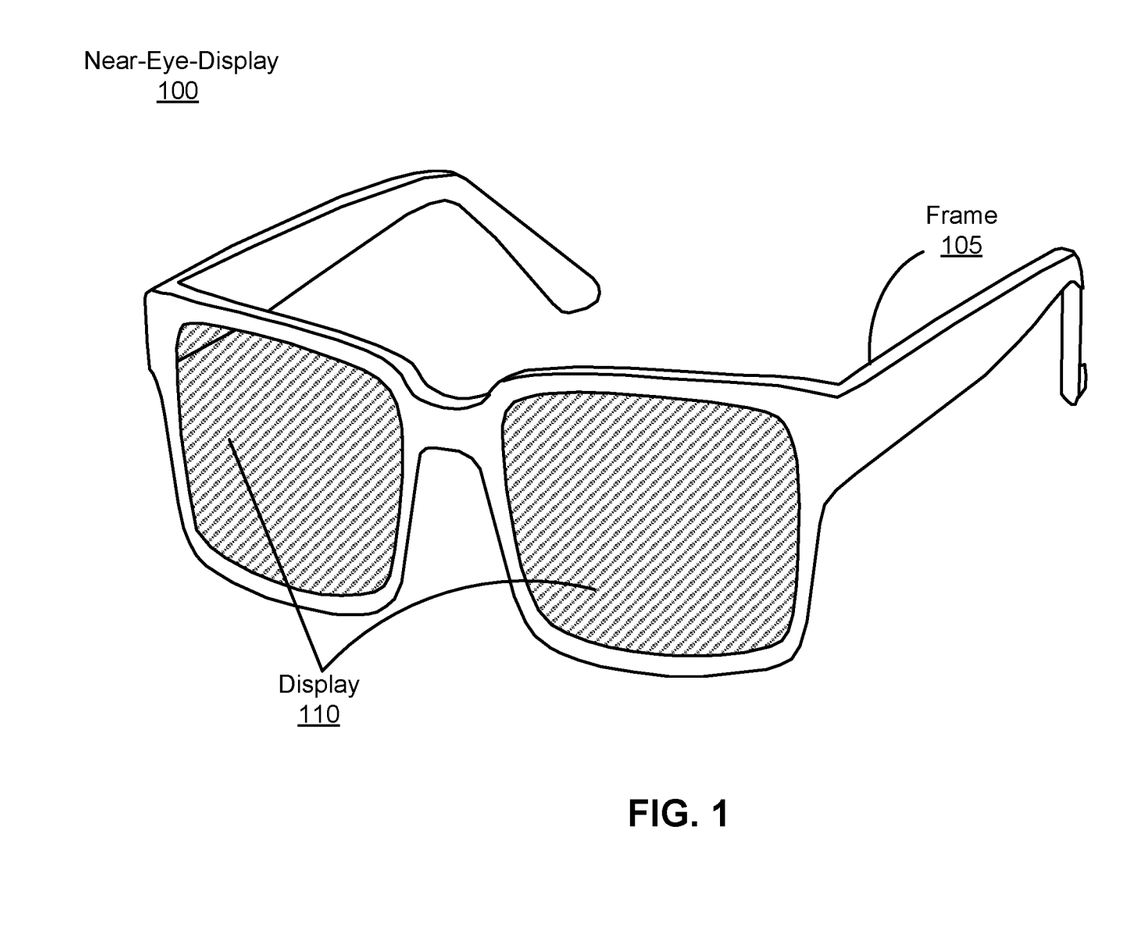
FIG. 1 is a diagram of a NED, in accordance with an embodiment.

FIG. 1 is a diagram of a near-eye-display (NED) 100, in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as an artificial reality NED. In some embodiments, the NED 100 may augment views of a physical, real-world environment with computer-generated elements (e.g., images, video, sound, etc.).

The NED 100 shown in FIG. 1 includes a frame 105 and a display 110. The frame 105 is coupled to one or more optical elements which together display media to users. In some embodiments, the frame 105 may represent a frame of eye-wear glasses. The display 110 is configured for users to see the content presented by the NED 100. As discussed below in conjunction with FIG. 2, the display 110 includes at least one waveguide display assembly (not shown) for directing one or more image light to an eye of the user. The waveguide display assembly includes at least one or more tiled waveguide displays. The waveguide display assembly may also include, e.g., a stacked waveguide display, a varifocal waveguide display, or some combination thereof. The tiled waveguide display is a display that can widen a field of view of the image light emitted from the waveguide display. The varifocal waveguide display is a display that can adjust a depth of focus of the image light emitted from the tiled waveguide display.

Figure 2:
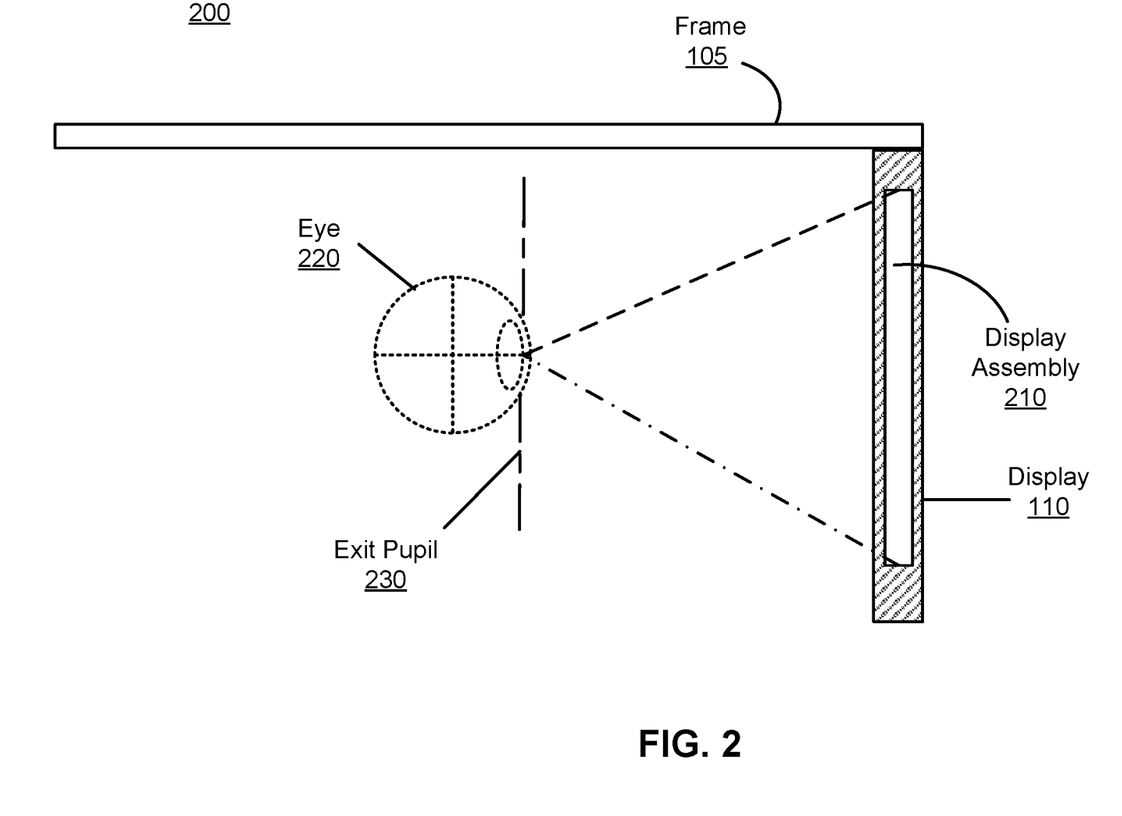
FIG. 2 is a cross-section of the NED illustrated in FIG. 1, in accordance with an embodiment.

FIG. 2 is a cross-section 200 of the NED 100 illustrated in FIG. 1, in accordance with an embodiment. The display 110 includes at least one display assembly 210. An exit pupil 230 is a location where the eye 220 is positioned when the user wears the NED 100. For purposes of illustration, FIG. 2 shows the cross section 200 associated with a single eye 220 and a single display assembly 210, but in alternative embodiments not shown, another waveguide display assembly which is separate from the waveguide display assembly 210 shown in FIG. 2, provides image light to another eye 220 of the user.

The display assembly 210, as illustrated below in FIG. 2, is configured to direct the image light to the eye 220 through the exit pupil 230. The display assembly 210 may be composed of one or more materials (e.g., plastic, glass, etc.) with one or more refractive indices that effectively minimize the weight and widen a field of view (hereinafter abbreviated as 'FOV') of the NED 100. In alternate configurations, the NED 100 includes one or more optical elements between the display assembly 210 and the eye 220. The optical elements may act to, e.g., correct aberrations in image light emitted from the display assembly 210, magnify image light emitted from the display assembly 210, some other optical adjustment of image light emitted from the display assembly 210, or some combination thereof. The example for optical elements may include an aperture, a Fresnel lens, a convex lens, a concave lens, a filter, or any other suitable optical element that affects image light.

In some embodiments, the display assembly 210 includes one or more tiled waveguide displays. In some embodiments, the tiled waveguide display may be part of the stacked waveguide display, or the varifocal display. The tiled waveguide display is a display that can widen a field of view of image light emitted from the waveguide display. The stacked waveguide display is a polychromatic display (e.g., a red-green-blue (RGB) display) created by stacking the tiled waveguide displays whose respective monochromatic sources are of different colors.

Figure 3A:
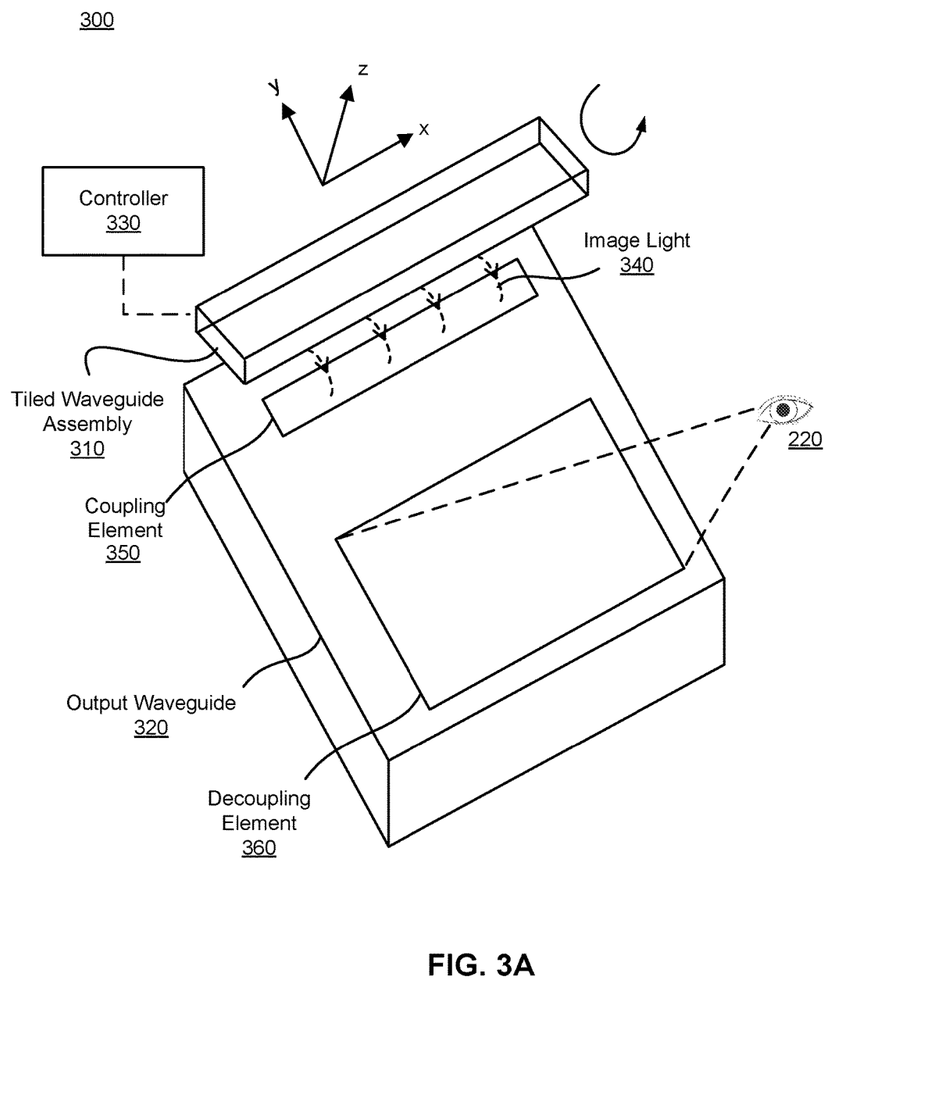
FIG. 3A illustrates an isometric view of a tiled waveguide display, in accordance with an embodiment.

FIG. 3A illustrates an isometric view of a waveguide display 300, in accordance with an embodiment. In some embodiments, the waveguide display 300 (may also be referred to as a tiled waveguide display) is a component (e.g., display assembly 210) of the NED 100. In alternate embodiments, the waveguide display 300 is part of some other NED, or other system that directs display image light to a particular location.

The waveguide display 300 includes at least a tiled waveguide assembly 310, an output waveguide 320, and a controller 330. For purposes of illustration, FIG. 3A shows the waveguide display 300 associated with a single eye 220, but in some embodiments, another waveguide display separate (or partially separate) from the waveguide display 300, provides image light to another eye of the user. In a partially separate system, one or more components may be shared between waveguide displays for each eye.

The tiled waveguide assembly 310 generates image light. The tiled waveguide assembly 310 includes a plurality of optical sources, a source waveguide, and a controller (e.g., as further described below with regard to FIG. 4). The tiled waveguide assembly 310 generates and outputs image light 340 to a coupling element 350 of the output waveguide 320.

The output waveguide 320 is an optical waveguide that outputs image light to an eye 220 of a user. The output waveguide 320 receives the image light 340 at one or more coupling elements 350, and guides the received input image light to one or more decoupling elements 360. In some embodiments, the coupling element 350 couples the image light 340 from the tiled waveguide assembly 310 into the output waveguide 320. The coupling element 350 may be, e.g., a diffraction grating, a holographic grating, some other element that couples the image light 340 into the output waveguide 320, or some combination thereof. For example, in embodiments where the coupling element 350 is diffraction grating, the pitch of the diffraction grating is chosen such that total internal reflection occurs, and the image light 340 propagates internally toward the decoupling element 360. For example, the pitch of the diffraction grating may be in the range of 300 nm to 600 nm.

The decoupling element 360 decouples the total internally reflected image light from the output waveguide 320. The decoupling element 360 may be, e.g., a diffraction grating, a holographic grating, some other element that decouples image light out of the output waveguide 320, or some combination thereof. For example, in embodiments where the decoupling element 360 is a diffraction grating, the pitch of the diffraction grating is chosen to cause incident image light to exit the output waveguide 320. For example, the pitch of the diffraction grating may be in the range of 300 nm to 600 nm. The pitch of the diffraction grating is chosen such that the image light 340 from the plurality of optical sources undergoes a total internal reflection inside the output waveguide 320 without leakage through higher order diffraction (e.g. second reflected order). An orientation and position of the image light exiting from the output waveguide 320 is controlled by changing an orientation and position of the image light 340 entering the coupling element 350. In some embodiments, the direction of the image light exiting from the output waveguide 320 is same as the direction of the image light 340. In one example, the position of the image light exiting from the output waveguide 320 is controlled by the location of the plurality of optical sources of the tiled waveguide assembly 310, the location of the coupling element 350 and the location of the decoupling element 360. Any change in the orientation of at least an optical source to cover a portion of the total FOV causes the image light exiting from the output waveguide 320 to cover the same portion of the total FOV. The total FOV is obtained by using a plurality of optical sources that cover the entire FOV. In addition, the total FOV is a function of a refractive index of the output waveguide 320, the pitch of the diffraction grating, a total number of optical sources of the tiled waveguide assembly 310, and a requirement of having no leakage light from the output waveguide 320 via second order diffraction.

The output waveguide 320 may be composed of one or more materials that facilitate total internal reflection of the image light 340. The output waveguide 320 may be composed of e.g., silicon, plastic, glass, or polymers, or some combination thereof. The output waveguide 320 has a relatively small form factor. For example, the output waveguide 320 may be approximately 50 mm wide along X-dimension, 30 mm long along Y-dimension and 0.5-1 mm thick along Z-dimension.

The controller 330 controls the scanning operations of the tiled waveguide assembly 310. The controller 330 determines display instructions for the tiled waveguide assembly 310 based at least on the one or more display instructions. Display instructions are instructions to render one or more images. In some embodiments, display instructions may simply be an image file (e.g., bitmap). The display instructions may be received from, e.g., a console of a VR system (e.g., as described below in conjunction with FIG. 5). Display instructions are instructions used by the tiled waveguide assembly 310 to generate image light 340. The display instructions may include, e.g., a type of a source of image light (e.g. monochromatic, polychromatic), an identifier for a particular light source assembly, an identifier for a particular tiled waveguide assembly, a scanning rate, an orientation of the source, one or more illumination parameters (described below with reference to FIG. 4), or some combination thereof. The controller 330 receives display instructions that controls the orientation of the expanded light 370 associated with a total field of view of the image light exiting the output waveguide 320. For example, the total field of view can be a sum of a field of view of each of the plurality of optical sources of the tiled waveguide assembly 310. In some embodiments, the total field of view can be a weighted sum of the field of view of each of the plurality of optical sources with the weights of each of the individual field of view determined based on an amount of overlap between the field of view from different optical sources. In some embodiments, the controller 330 also receives display instructions that includes identifier information to select the tiled waveguide assembly that receives the display instructions. The controller 330 includes a combination of hardware, software, and/or firmware not shown here so as not to obscure other aspects of the disclosure.

Figure 3B:
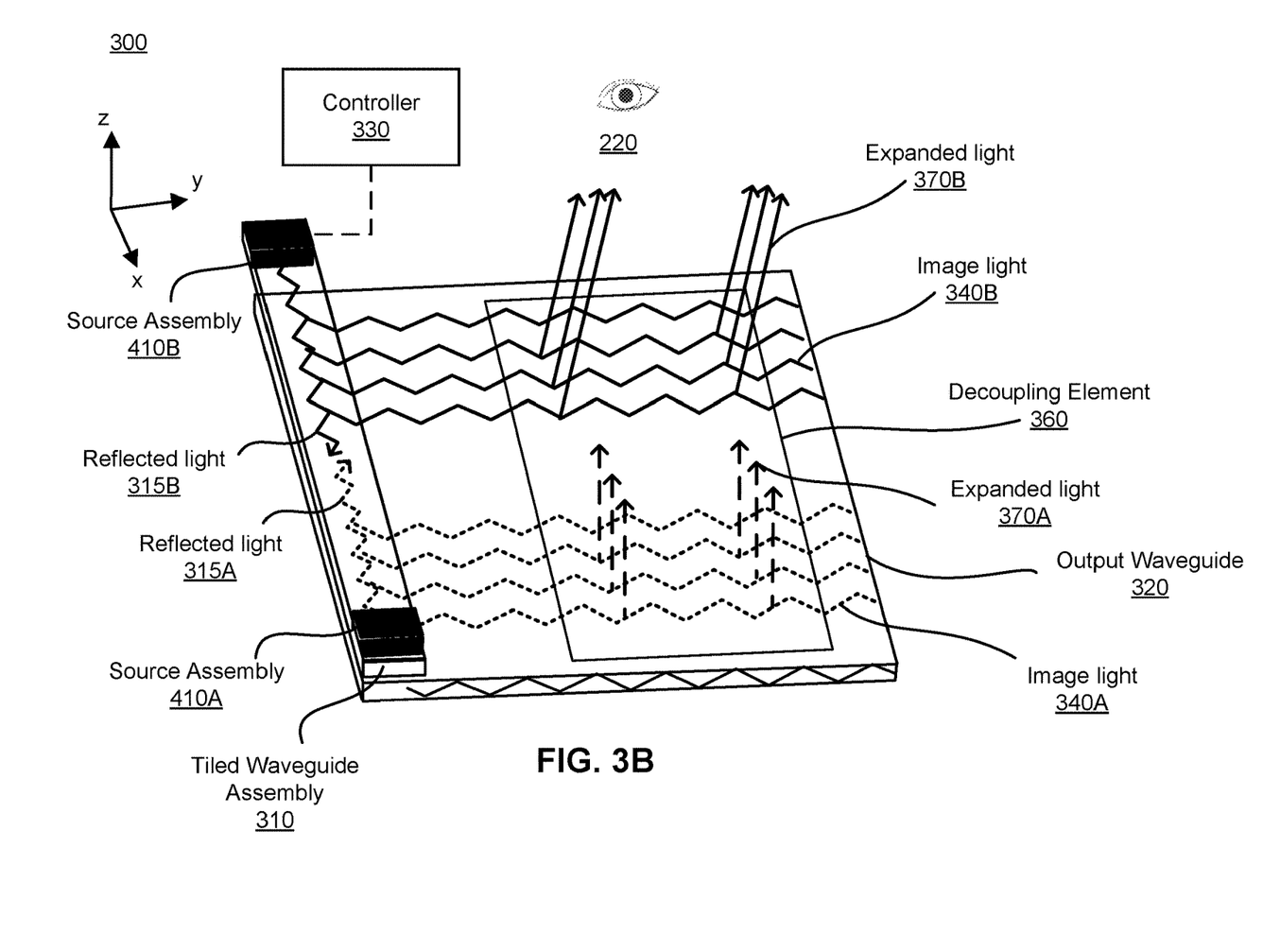
FIG. 3B illustrates an alternate view of the tiled waveguide display of FIG. 3A, in accordance with an embodiment.

FIG. 3B illustrates an alternate view of the waveguide display 300, in accordance with an embodiment. FIG. 3B is an embodiment of the waveguide display 300 of FIG. 3A, and all the details described above with reference to FIG. 3A apply to FIG. 3B as well. FIG. 3B illustrates the propagation of one or more reflected image light 315 through the tiled waveguide assembly 310.

The tiled waveguide assembly 310 receives image light from each of the optical source assemblies 410A and 410B, described in detail below in conjunction with FIG. 4, and expands each of the image light along two opposite directions. The tiled waveguide assembly 310 generates a reflected light 315A that undergoes total internal reflection and propagates generally along a negative X-dimension. The tiled waveguide assembly 310 generates a reflected light 315B that undergoes total internal reflection and propagates generally along a positive X-dimension. The direction of propagation of the reflected light 315 is based on the pitch of the diffraction gratings and the occurrence of total internal reflection of the image light from each of the plurality of optical sources for a desired range of angles of incidence to achieve a specific order of diffraction of interest. For example, to achieve a positive first order of diffraction (+1), the pitch of diffraction grating of the coupling element 350 is designed such that the reflected light 315B propagates along the positive X direction. Similarly, the pitch of another diffraction grating of the coupling element 350 is designed such that the reflected light 315A propagates along the negative X direction to achieve a negative first order of diffraction (−1). The tiled waveguide assembly 310 generates and outputs an image light 340 to the output waveguide 320. In some embodiments, the image light 340 includes an image light 340A and an image light 340B. The image light 340 undergoes total internal reflection at the output waveguide 320 as illustrated in FIG. 3B. The image light 340 decouples through the decoupling element 360 as expanded light 370 and reaches the eye 220. In some embodiments, the expanded light 370A represents an expanded image light emitted at a perpendicular direction to the surface of the output waveguide 320. The expanded light 370B represents an image light emitted at an angle of inclination to the surface of the output waveguide 320. In some configurations, the angle of inclination of the expanded image light 370B can range from −30 degrees to +30 degrees.

Figure 3C:
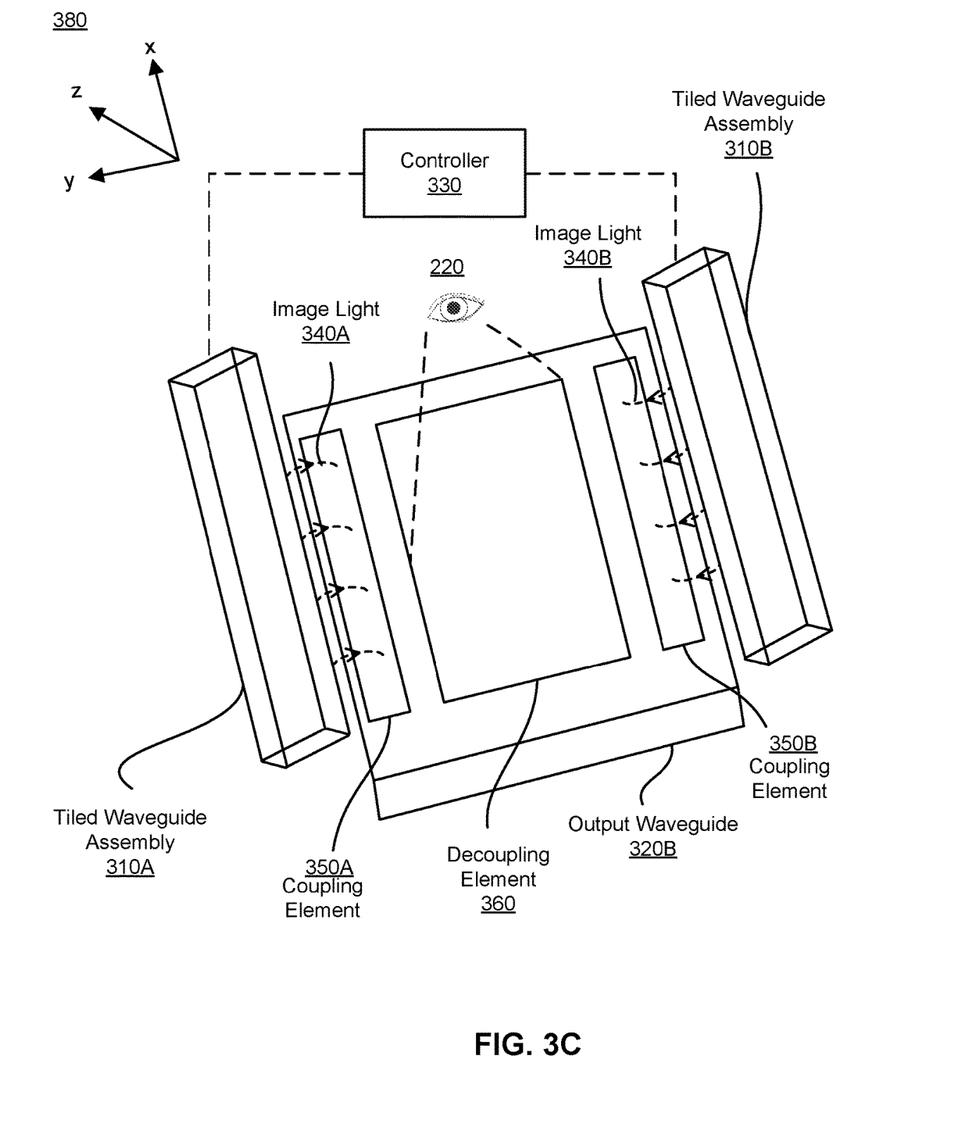
FIG. 3C illustrates an isometric view of a waveguide display including multiple tiled waveguide assemblies, in accordance with an embodiment.

FIG. 3C an isometric view of a waveguide display 380 including multiple tiled waveguide assemblies 310A and 310B, in accordance with an embodiment. FIG. 3C is an embodiment of the waveguide display 300 of FIG. 3A. The waveguide display 380 of FIG. 3C includes a tiled waveguide assembly 310A, a tiled waveguide assembly 310B, an output waveguide 320B, and the controller 330. The tiled waveguide assembly 310A and 310B are substantially similar to the tiled waveguide assembly 310 of FIG. 3A. The output waveguide 320B is structurally similar to the output waveguide 320 of FIG. 3A except for a coupling element 350B. The coupling element 350B is an embodiment of the coupling element 350 of FIG. 3A.

The tiled waveguide assembly 310A outputs an image light 340A to the coupling element 350A. The tiled waveguide assembly 310B outputs an image light 340B to the coupling element 350B. The image light 340A and 340B are embodiments of the image light 340 of FIG. 3A. In the example of FIG. 3C, the tiled waveguide assembly 310A is oriented along the x-dimension and the tiled waveguide assembly 310B is oriented along the same x-dimension at an offset from the tiled waveguide assembly 310A. In some embodiments, the offset is determined by a desired size of an eye box, the total FOV, and an eye relief distance. The offset is also associated with defining how large of an output area (e.g. 40 mm×30 mm) is needed to give the desired size of the eye box for a given total FOV, and the eye relief distance.

Figure 4:
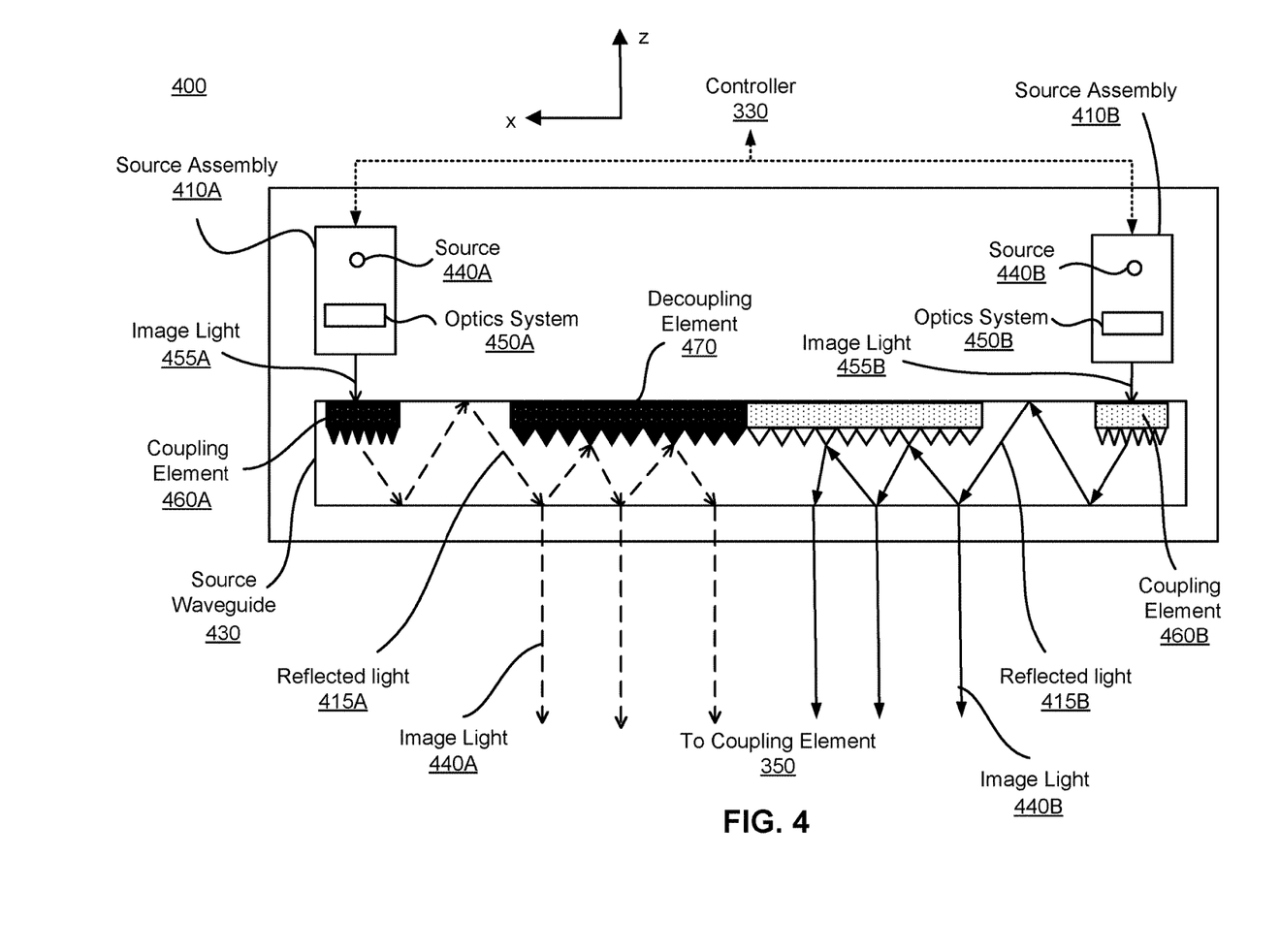
FIG. 4 illustrates a cross-section of a tiled waveguide display, in accordance with an embodiment.

FIG. 4 illustrates a cross-section 400 of the waveguide assembly 300, in accordance with an embodiment. The cross-section 400 of the tiled waveguide assembly 300 includes a source assembly 410A, a source assembly 410B, and a source waveguide 430.

The source assemblies 410A and 410B generate light in accordance with display instructions from the controller 330. The source assembly 410A includes a source 440A, and an optics system 450A. The source 440A is a source of light that generates at least a coherent or partially coherent image light. The source 440A may be, e.g., a laser diode, a vertical cavity surface emitting laser, a light emitting diode, a tunable laser, or some other light source that emits coherent or partially coherent light. The source 440A emits light in a visible band (e.g., from about 390 nm to 700 nm), and it may emit light that is continuous or pulsed. In some embodiments, the source 440A may be a laser that emits light at a particular wavelength (e.g., 532 nanometers). The source 440A emits light in accordance with one or more illumination parameters received from the controller 330. An illumination parameter is an instruction used by the source 440A to generate light. An illumination parameter may include, e.g., source wavelength, pulse rate, pulse amplitude, beam type (continuous or pulsed), other parameter(s) that affect the emitted light, or some combination thereof. The source assembly 410B is structurally similar to the source assembly 410A except for the identifier information in the display instructions from the controller 330.

In some embodiments, the source assembly 410A and the source assembly 410B are located on opposite ends of the source waveguide 430. The source assembly 410A generates an image light directed along the negative z-dimension and in-coupled by the source waveguide 430 so as to propagate toward the negative x-dimension. The source assembly 410B generates an image light directed along the positive z-dimension and in-coupled by the source waveguide 430 so as to propagate toward the positive x-dimension.

The optics system 450 includes one or more optical components that condition the light from the source 440. Conditioning light from the source 440 may include, e.g., expanding, collimating, adjusting orientation in accordance with instructions from the controller 330, some other adjustment of the light, or some combination thereof. The one or more optical components may include, e.g., lenses, mirrors, apertures, gratings, or some combination thereof. Light emitted from the optics system 450 (and also the source assembly 410) is referred to as image light 455. The optics system 450 outputs the image light 455 toward the source waveguide 430.

The source waveguide 430 is an optical waveguide. The source waveguide 430 may be composed of one or more materials that facilitate total internal reflection of the image light 455. The source waveguide 430 may be composed of e.g., silicon, plastic, glass, or polymers, a material with an index of refraction below 2, or some combination thereof. The source waveguide 430 has a relatively small form factor. For example, the source waveguide 430 may be approximately 50 mm long along X-dimension, 3 mm wide along Y-dimension, and 0.5-1 mm thick along Z-dimension.

The source waveguide 430 includes a coupling element 460A and a decoupling element 470. The source waveguide 430 receives the image light 455A emitted from the source assembly 410A at the coupling element 460A. The coupling element 460A couples the image light 455A from the source assembly 410A into the source waveguide 430. The coupling element 460A may be, e.g., a diffraction grating, a holographic grating, a reflective surface, a prismatic structure, a side or edge of the body of the source waveguide 430, some other element that couples the image light 455A into the source waveguide 430, or some combination thereof. For example, in embodiments where the coupling element 460A is diffraction grating, the pitch of the diffraction grating is chosen such that total internal reflection occurs, and the image light 455A propagates internally toward the decoupling element 470. For example, the pitch of the diffraction grating may be in the range of 300 nm to 600 nm.

The decoupling element 470 decouples the total internally reflected image light 455A from the source waveguide 430. In some embodiments, the decoupling element 470 includes a variation in the design of the diffraction grating (e.g. pitch) so that decoupling of an image light is more efficient to a given range of angles of incidence in certain parts of the diffraction grating. The decoupling element 470 may be, e.g., a diffraction grating, a holographic grating, a reflective surface, a prismatic structure, a side or edge of the body of the source waveguide 430, some other element that decouples image light out of the source waveguide 430, or some combination thereof. For example, in embodiments where the decoupling element 470 is a diffraction grating, the pitch of the diffraction grating is chosen to cause incident image light to exit the source waveguide 430. An orientation of the image light exiting from the source waveguide 430 may be altered by varying the orientation of the image light exiting the source assembly 410A, varying an orientation of the source assembly 410A, or some combination thereof. For example, the pitch of the diffraction grating may be in the range of 300 nm to 600 nm.

In a typical near-eye-display (NED) system using diffraction gratings as coupling elements, the limit for the FOV is based on satisfying two physical conditions: (1) an occurrence of total internal reflection of image light coupled into the source waveguide 430 and (2) an existence of a first order diffraction of the coupling element 460A and 460B over the FOV of their respective image sources. Conventional methods used by the NED systems based on diffracting gratings rely on satisfying the above two physical conditions in order to achieve a large FOV (e.g. above 40 degrees) by using materials with a high refractive index, wherein the said methods add significantly heavy and expensive components to the NED system. In contrast, the waveguide display 300 relies on splitting the FOV into two half spaces by separating the coupling elements 460A and 460B, each of the coupling elements configured to receive the image light 455A and the image light 455B, respectively. Accordingly, the value of the pitch of the diffraction grating inside the coupling element 460A determines the limit for the first order diffraction of the image light 455A and the limit for the total internal reflection of the image light 455A inside the source waveguide 430.

As both the coupling element 460A and the coupling element 460B reflect an image light to the same decoupling element 470, the pitch of the diffraction grating is the same in order to form a non-distorted image. In this case, the optical sources are configured to provide half of the FOV, for example, the image light 455A provides from –FOV/2 to 0 and the image light 455B provides from 0 to FOV/2. In a second example, the image light 455A provides from 0 to FOV/2 and the image light 455B provides from –FOV/2 to 0. The pitch of the diffraction grating is selected so that the FOV corresponding to the image light 455A is coupled into a positive first (+1) order of diffraction and the FOV of the image light 455B is coupled into a negative first (−1) order of diffraction. To maximize the brightness of the display presented to the user's eye, the grating profile of the coupling element 460A and the coupling element 460B are designed separately to optimize the amount of light coupled into the desired diffraction orders, respectively. In addition, the pitch of the diffraction grating may be adjusted to minimize light leakage out of the source waveguide 430 via diffraction to higher order diffracted modes.

The decoupling element 470 outputs the image light 440A and the image light 440B to the output waveguide 320. The value of the pitch of the diffraction grating inside the decoupling element 470 is selected to be equal to that of the coupling element 460A and the coupling element 460B in order to form an undistorted image for the image light in the display presented to the user's eyes. The grating profile is designed so that light is decoupled from the source waveguide 430 partially in each interception of the image light with the decoupling element 470. The multiple partial diffractions of the light with the decoupling element 470 results in the total expansion along the x-dimension of the image light 440.

The image light 440A exiting the source waveguide 430 is expanded at least along one dimension (e.g., may be elongated along x-dimension). The image light 440 couples to an output waveguide 320 as described above with reference to FIG. 3A.

In some embodiments, the decoupling element 470 has an extended length in the direction of propagation of an image light trapped inside the source waveguide 430. The decoupling element 470 may represent an exit pupil of the source waveguide 430.

The controller 330 controls the source assembly 410A by providing display instructions to the source assembly 410A. The display instructions cause the source assembly 410A to render light such that image light exiting the decoupling element 360 of the output waveguide 320 scans out one or more 2D images. For example, the display instructions may cause the tiled waveguide assembly 310 to generate a two-dimensional image from a 1-D array pattern of image light generated by the source assembly 410 (e.g. using a 1-D array of MicroLEDs and a collimating lens). The controller 330 controls the source waveguide 430 by providing scanning instructions to the source waveguide 430. The scanning instructions cause the source waveguide 430 to perform a scanning operation of the source waveguide 430, in accordance with a scan pattern (e.g., raster, interlaced, etc.) The display instructions control an intensity of light emitted from the source 440, and the optics system 450 scans out the image by rapidly adjusting orientation of the emitted light. If done fast enough, a human eye integrates the scanned pattern into a single 2D image. The display instructions also control a direction (e.g. clock-wise or anti-clockwise) and a speed of rotation of the source waveguide 430.

In some configurations, the total field of view of the tiled waveguide display 310 can be determined from the sum of the field of view corresponding to the image light 455A and the image light 455B. In a typical NED system, the field of view is restricted to half of the total field of view of the tiled waveguide display 310 as there is no splitting of the field of view using two source assemblies. In addition, the tiled waveguide display 310 has a relaxation in the form factor of the light source assemblies 410A and 410B as the field of view for each of the sources 440A and 440B is half of the field of view for a waveguide display with a single light source.

Figure 5:
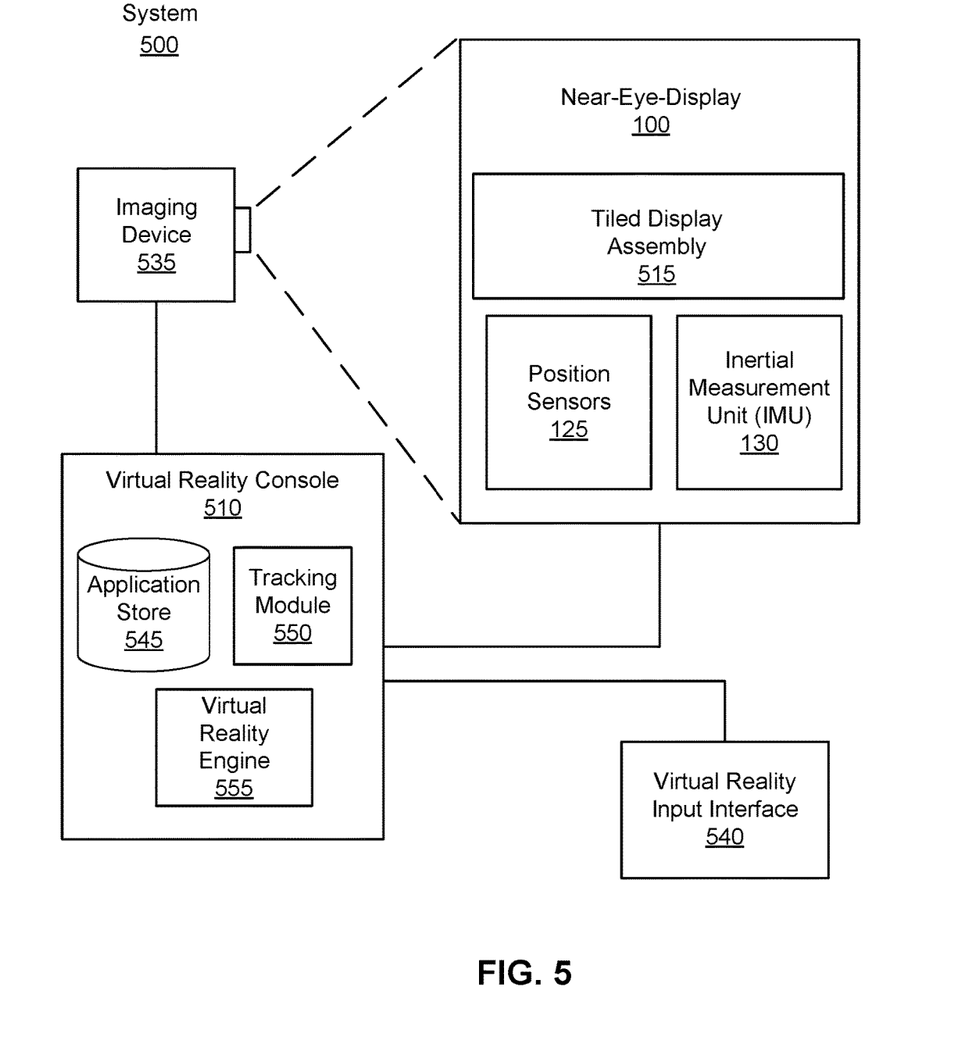
FIG. 5 is a block diagram of a system including the NED, according to an embodiment.

FIG. 5 is a block diagram of a system 500 including the NED 100, according to an embodiment. The system 500 shown by FIG. 5 comprises the NED 100, an imaging device 535, and a VR input interface 540 that are each coupled to the VR console 510. While FIG. 5 shows an example system 500 including one NED 100, one imaging device 535, and one VR input interface 540, in other embodiments, any number of these components may be included in the system 500. For example, there may be multiple NEDs 100 each having an associated VR input interface 540 and being monitored by one or more imaging devices 535, with each NED 100, VR input interface 540, and imaging devices 535 communicating with the VR console 510. In alternative configurations, different and/or additional components may be included in the system 500. Similarly, functionality of one or more of the components can be distributed among the components in a different manner than is described here. For example, some or all of the functionality of the VR console 510 may be contained within the NED 100. Additionally, in some embodiments the VR system 500 may be modified to include other system environments, such as an AR system environment, or more generally an artificial reality environment.

The IMU 130 is an electronic device that generates fast calibration data indicating an estimated position of the NED 100 relative to an initial position of the NED 100 based on measurement signals received from one or more of the position sensors 125. A position sensor 125 generates one or more measurement signals in response to motion of the NED 100. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof. In the embodiment shown by FIG. 5, the position sensors 125 are located within the IMU 130, and neither the IMU 130 nor the position sensors 125 are visible to the user (e.g., located beneath an outer surface of the NED 100).

Based on the one or more measurement signals generated by the one or more position sensors 125, the IMU 130 generates fast calibration data indicating an estimated position of the NED 100 relative to an initial position of the NED 100. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals from various position sensors 125 and calculates the estimated position of the NED 100 from the sampled data. For example, the IMU 130 integrates the measurement signals received from one or more accelerometers over time to estimate a velocity vector and integrates the velocity vector over time to determine an estimated position of a reference point on the NED 100. The reference point is a point that may be used to describe the position of the NED 100. While the reference point may generally be defined as a point in space; however, in practice, the reference point is defined as a point within the NED 100 (e.g., the reference point 115 representing a center of the IMU 130).

The imaging device 535 generates slow calibration data in accordance with calibration parameters received from the VR console 510. The imaging device 535 may include one or more cameras, one or more video cameras, one or more filters (e.g., used to increase signal to noise ratio), or any combination thereof. The imaging device 535 is configured to detect image light emitted or reflected in the FOV of the imaging device 535. In embodiments where the NED 100 include passive elements (e.g., a retroreflector), the imaging device 535 may retro-reflect the image light towards the image light source in the imaging device 535. Slow calibration data is communicated from the imaging device 535 to the VR console 510, and the imaging device 535 receives one or more calibration parameters from the VR console 510 to adjust one or more imaging parameters (e.g., focal length, focus, frame rate, ISO, sensor temperature, shutter speed, aperture, etc.).

The VR input interface 540 is a device that allows a user to send action requests to the VR console 510. An action request is a request to perform a particular action. For example, an action request may be to start or end an application or to perform a particular action within the application. The VR input interface 540 may include one or more input devices. Example input devices include: a keyboard, a mouse, a game controller, or any other suitable device for receiving action requests and communicating the received action requests to the VR console 510. An action request received by the VR input interface 540 is communicated to the VR console 510, which performs an action corresponding to the action request. In some embodiments, the VR input interface 540 may provide haptic feedback to the user in accordance with instructions received from the VR console 510. For example, haptic feedback is provided when an action request is received, or the VR console 510 communicates instructions to the VR input interface 540 causing the VR input interface 540 to generate haptic feedback when the VR console 510 performs an action.

The VR console 510 provides media to the NED 100 for presentation to the user in accordance with information received from one or more of: the imaging device 535, the NED 100, and the VR input interface 540. In the example shown in FIG. 5, the VR console 510 includes an application store 545, a tracking module 550, and a VR engine 555. Some embodiments of the VR console 510 have different modules than those described in conjunction with FIG. 5. Similarly, the functions further described below may be distributed among components of the VR console 510 in a different manner than is described here.

The application store 545 stores one or more applications for execution by the VR console 510. An application is a group of instructions, that when executed by a processor, generates content for presentation to the user. Content generated by an application may be in response to inputs received from the user via movement of the NED 100 or the VR input interface 540. Examples of applications include: gaming applications, conferencing applications, video playback application, or other suitable applications.

The tracking module 550 calibrates the VR system 500 using one or more calibration parameters and may adjust one or more calibration parameters to reduce error in determination of the position of the NED 100. For example, the tracking module 550 adjusts the focus of the imaging device 535 to obtain a more accurate position on the VR headset. Moreover, calibration performed by the tracking module 550 also accounts for information received from the IMU 530. Additionally, if tracking of the NED 100 is lost, the tracking module 550 re-calibrates some or the entire system environment 500.

The tracking module 550 tracks movements of the NED 100 using slow calibration information from the imaging device 535. The tracking module 550 also determines positions of a reference point of the NED 100 using position information from the fast calibration information. Additionally, in some embodiments, the tracking module 550 may use portions of the fast calibration information, the slow calibration information, or some combination thereof, to predict a future location of the NED 100. The tracking module 550 provides the estimated or predicted future position of the NED 100 to the VR engine 555.

The VR engine 555 executes applications within the system 500 and receives position information, acceleration information, velocity information, predicted future positions, or some combination thereof of the NED 100 from the tracking module 550. In some embodiments, the information received by the VR engine 555 may be used for producing a signal (e.g., display instructions) to the waveguide display assembly 515 that determines the type of content presented to the user. For example, if the received information indicates that the user has looked to the left, the VR engine 555 generates content for the NED 100 that mirrors the user's movement in a virtual environment by determining the type of source and the waveguide that operate in the waveguide display assembly 515. For example, the VR engine 555 may produce a display instruction that would cause the waveguide display assembly 515 to generate content with red, green, and blue color. Additionally, the VR engine 555 performs an action within an application executing on the VR console 510 in response to an action request received from the VR input interface 540 and provides feedback to the user that the action was performed. The provided feedback may be visual or audible feedback via the NED 100 or haptic feedback via the VR input interface 540.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A waveguide display, comprising:
   a first light source configured to emit first image light corresponding to a first portion of an image;
   a second light source configured to emit second image light corresponding to a second portion of the image that is different than the first portion of the image;
   a source waveguide including a first entrance area, a second entrance area, a first exit area, and a second exit area, the source waveguide configured to:
      in-couple the first image light at the first entrance area, expand the first image light in at least one dimension, and output the expanded first image light via the first exit area, and
      in-couple the second image light at the second entrance area, expand the second image light in a first dimension, and output the expanded second image light via the second exit area; and
   an output waveguide including a third entrance area and a third exit area, the output waveguide configured to in-couple the first image light and the second image light at the third entrance area, expand the expanded first image light and the expanded second image light in at least one dimension that is orthogonal to the first dimension to generate a portion of a magnified image, and output the portion of the magnified image via the third exit area towards an eyebox.

2. The waveguide display of claim 1, wherein the source waveguide receives the first image light at a first region and the second image light at a second region, the first region and the second region located at opposite edges of the source waveguide.

3. The waveguide display of claim 1, wherein the first entrance area comprises a first coupling element, and the second entrance area comprises a second coupling element, each of the first coupling element and the second coupling element further comprising a plurality of grating elements of a grating period selected based on a refractive index of a material forming the source waveguide.

4. The waveguide display of claim 1, wherein the source waveguide is associated with a first field of view and a second field of view, each of the first field of view and the second field of view is a function of a refractive index of a material forming the source waveguide.

5. The waveguide display of claim 4, wherein each of the first field of view and the second field of view is determined based on an angle of inclination of the first image light from the first light source and the second image light from the second light source.

6. The waveguide display of claim 1, wherein the expanded first image light is propagating along a first direction and the expanded second image light is propagating along a second direction opposite to the first direction.

7. The waveguide display of claim 1, wherein each of the in-coupled first image light and the in-coupled second image light undergoes a total internal reflection inside the source waveguide.

8. The waveguide display of claim 1, wherein each of the in-coupled first image light and the in-coupled second image light undergoes a first order diffraction inside the source waveguide.

9. The waveguide display of claim 1, further comprising a first source waveguide and a second source waveguide, the first source waveguide expanding along a first dimension and the second source waveguide expanding along a second dimension orthogonal to the first dimension.

10. The waveguide display of claim 1, wherein the third entrance area comprises a first coupling element and a second coupling element, each of the first coupling element and the second coupling element further comprising a plurality of gratings of a grating period selected based on a refractive index of a material forming the output waveguide.

11. A source waveguide comprising:
- a first entrance area configured to in-couple a first image light corresponding to a first portion of an image from a first light source, the source waveguide expanding the first image light in at least one dimension;
- a second entrance area configured to in-couple a second image light corresponding to a second portion of an image from a second light source, the second portion of the image different than the first portion of the image, the source waveguide expanding the second image light in at least one dimension;
- a first exit area configured to output the expanded first image light; and
- a second exit area configured to output the expanded second image light.

12. The source waveguide of claim 11, wherein the source waveguide receives the first image light at a first region and the second image light at a second region, the first region and the second region located at opposite edges of the source waveguide.

13. The source waveguide of claim 11, wherein the first entrance area comprises a first coupling element and the second entrance area comprises a second coupling element, each of the first coupling element and the second coupling element further comprising a plurality of grating elements of a grating period selected based on a refractive index of a material forming the source waveguide.

14. The source waveguide of claim 11, wherein the source waveguide is associated with a first field of view and a second first field of view, each of the first field of view and the second field of view is a function of a refractive index of a material forming the source waveguide.

15. The source waveguide of claim 14, wherein each of the first field of view and the second field of view is determined based on an angle of inclination of the first image light from the first light source and the second image light from the second light source.

16. The source waveguide of claim 11, wherein the expanded first image light is propagating along a first direction and the expanded second image light is propagating along a second direction opposite to the first direction.

17. The source waveguide of claim 11, wherein each of the in-coupled first image light and the in-coupled second image light undergoes a total internal reflection inside the source waveguide.

18. The source waveguide of claim 11, wherein each of the in-coupled first image light and the in-coupled second image light undergoes a first order diffraction inside the source waveguide.

19. The source waveguide of claim 11, further comprising at least a first source waveguide and a second source waveguide, the first source waveguide expanding along a first dimension and the second source waveguide expanding along a second dimension orthogonal to the first dimension.

* * * * *